United States Patent [19]
Jung et al.

[11] Patent Number: 6,127,673
[45] Date of Patent: Oct. 3, 2000

[54] APPARATUS AND METHOD FOR DETECTING CURVATURE

[75] Inventors: Wayne L. Jung; Russell W. Jung, both of Morton Grove; Alan R. Loudermilk, Chicago, all of Ill.

[73] Assignee: LJ Laboratories, L.L.C., Chicago, Ill.

[21] Appl. No.: 09/113,805

[22] Filed: Jul. 9, 1998

[51] Int. Cl.$^7$ .................................................. G01N 21/47
[52] U.S. Cl. ..................................... 250/227.16; 356/446
[58] Field of Search ........................ 256/227.16; 356/446

[56] References Cited

U.S. PATENT DOCUMENTS

| | | | |
|---|---|---|---|
| 4,487,206 | 12/1984 | Aagard | 128/667 |
| 4,986,671 | 1/1991 | Sun et al. | 374/131 |
| 5,164,597 | 11/1992 | Lodder | 356/338 |
| 5,308,771 | 5/1994 | Zhou et al. | 436/39 |
| 5,850,195 | 12/1998 | Berlien, Jr. et al. | 341/137 |

OTHER PUBLICATIONS

Aswell, Cecil J. et al., "A Monolithic Light–to–Frequency Converter with a Scalable Sensor Array", IEEE, 1994, pp. 122–123 and 158–159.

*Primary Examiner*—Richard A. Rosenberger
*Attorney, Agent, or Firm*—Loudermilk & Associates

[57] ABSTRACT

An apparatus and method for detecting, determining and/or quantifying cable flexing for use in optical instruments or in other instruments such as strain gauges, seismometers, and other instruments in which it is desired to detect, determine and/or quantify the degree of flex of a cable or implement that includes, or may be adapted to include, such a cable. A fiber optic, light conduit or similar cable is provided, which may provide light to, and receive light from, an object or material that is being optically characterized. Light may pass from a light source to an object or material, and be returned from the object or material to a spectrometer or set of sensors for determining the optical characteristics of the object or material. A light path is provided through the cable from the object or an end point of the cable to a spectrometer or sensors to return light in order to detect, determine and/or quantify the degree of flex in the cable or changes in the flex of the cable.

15 Claims, 2 Drawing Sheets

APPARATUS AND METHOD FOR DETECTING CURVATURE

FIELD OF THE INVENTION

The present invention relates to devices and methods for detecting curvature, and more particularly to devices and methods for detecting curvature in systems employing fiber optic cables and the like, including in systems for measuring optical characteristics such as color spectrums, translucence, gloss, opalescence and other characteristics of objects including, but not limited to, teeth or other dental objects.

BACKGROUND OF THE INVENTION

Systems employing fiber optics, light guides or the like are in use and/or under consideration in a variety of fields. For examples of such systems and methods that may be used to measure or characterize the optical properties of a wide variety of objects and materials, reference is made to the following copending applications and/or patents, all by the inventors hereof, and all of which are hereby incorporated by reference: U.S. application Ser. No. 09/091,208 filed on Jun. 8, 1998, which is based on International Application No. PCT/US97/00126, filed on Jan. 2, 1997, which is a continuation in part of U.S. application Ser. No. 08/581,851, now U.S. Pat. No. 5,745,229, issued Apr. 28, 1998, for Apparatus and Method for Measuring Optical Characteristics of an Object; U.S. application Ser. No. 09/091,170 filed on Jun. 8, 1998, which is based on International Application No. PCT/US97/00129, filed on Jan. 2, 1997, which is a continuation in part of U.S. application Ser. No. 08/582,054, now U.S. Pat. No. 5,759,030 issued Jun. 2, 1998, for Apparatus and Method for Measuring Optical Characteristics of Teeth; PCT Application No. PCT/US98/13764 filed on Jun. 30, 1998, which is a continuation in part of U.S. application Ser. No. 08/886,223, filed on Jul. 1, 1997, for Apparatus and Method for Measuring Optical Characteristics of an Object; PCT Application No. PCT/US98/13765 filed on Jun. 30, 1998, which is a continuation in part of U.S. application Ser. No. 08/886,564, filed on Jun. 30, 1998, for Apparatus and Method for Measuring Optical Characteristics of Teeth; and U.S. application Ser. No. 08/886,566, filed on Jul. 1, 1997, for Method and Apparatus for Detecting and Preventing Counterfeiting. Also incorporated by reference are two applications filed on even date herewith by the inventors hereof for Apparatus and Method for Measuring Optical Characteristics of an Object.

In such systems, it often is desired to obtain precise spectral or other optical characteristics data based on measurements taken by the system. Certain of such systems may employ a flexible fiber optic, light guide or similar cable. Unfortunately, however, flexing or changes in the flex of such a cable can affect the spectral transmission properties of the cable, thereby undesirably altering the spectral data generated by the system.

In such systems and in other applications, there is a need to detect, determine and/or quantify such cable flexing.

SUMMARY OF THE INVENTION

The present invention provides an apparatus and method for detecting, determining and/or quantifying such cable flexing for use in systems such as described and/or referenced above, or in other instruments such as strain gauges, seismometers, and other instruments in which it is desired to detect, determine and/or quantify the degree of flex of a cable or implement that includes, or may be adapted to include, such a cable.

In accordance with the present invention, a fiber optic cable is provided, which in certain embodiments provides light to, and receives light from, an object or material that is being optically characterized. Light passes from a light source to an object or material, and is returned from the object or material to a spectrometer or set of sensors for determining the optical characteristics of the object or material. A (secondary) light path through the cable from the object to the spectrometer or sensors is provided to return light in order to detect, determine and/or quantify the degree of flex in the cable or changes in the flex of the cable.

In accordance with other aspects of the present invention, such a cable is provided in an instrument or implement, with light passing through the cable to a spectrometer and/or sensors in order to detect, determine and/or quantify the degree of flex in the cable or changes in the flex of the cable.

Other objects, embodiments and/or aspects of the present invention will be understood from the detailed description to follow.

BRIEF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

Figure 1:
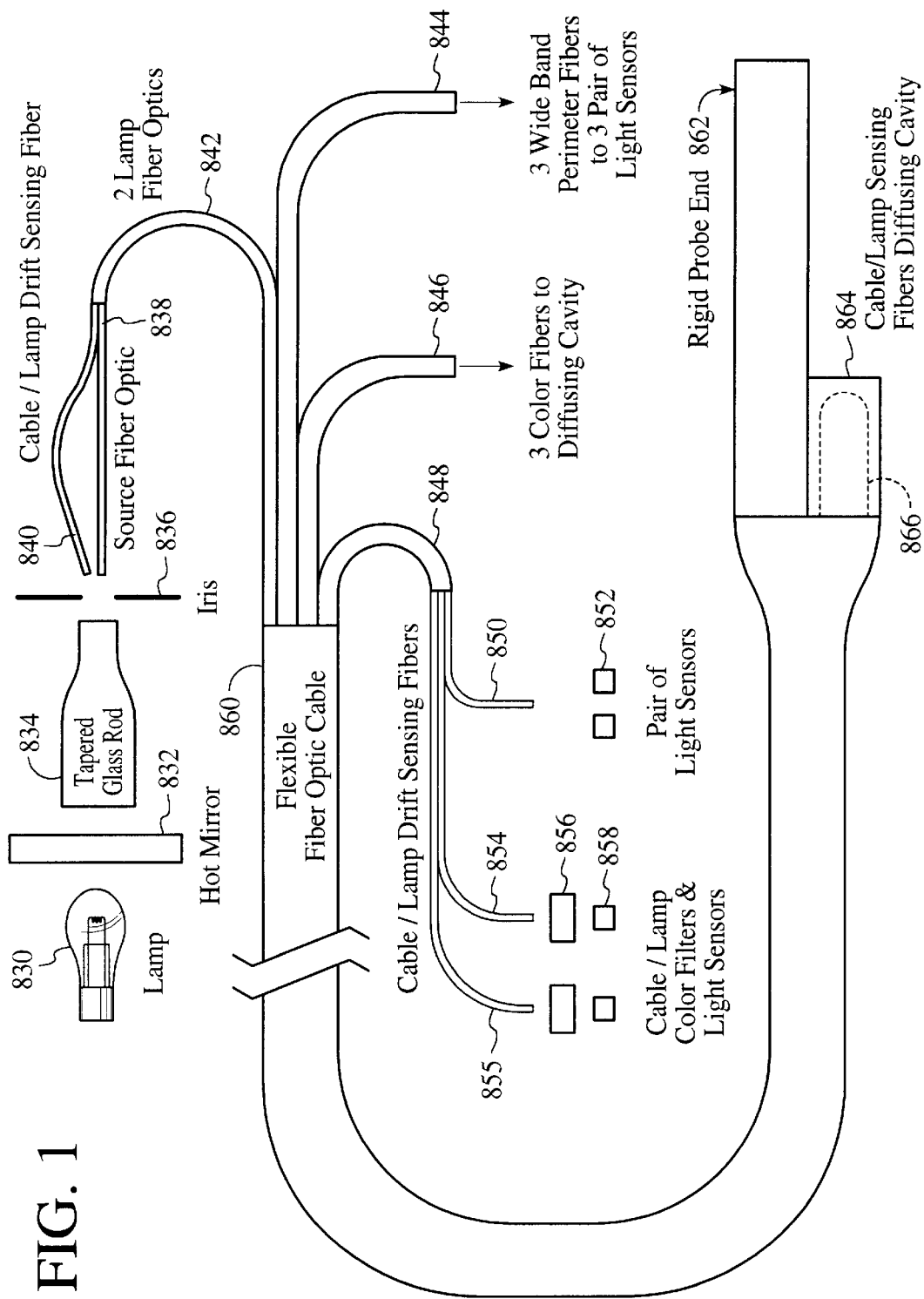
FIG. 1 is a diagram illustrating an embodiment of the present invention utilized in an instrument for characterizing the optical properties of an object.

The present invention will be described in greater detail with reference to certain preferred embodiments and certain other embodiments, which may serve to further the understanding of preferred embodiments of the present invention. At various places herein, reference is made to an "object," "material," etc., for example. It should be understood that one exemplary use of the present invention is for instruments and methods in the field of dentistry, and thus the object typically should be understood to include teeth, dentures or other prosthesis or restorations, dental-type cements or the like or other dental objects, although for discussion purposes in certain instances reference is only made to the "object." As described elsewhere herein, various refinements and substitutions of the various embodiments are possible based on the principles and teachings herein.

In the description to follow, references such as "described elsewhere" generally refer to description in one or more of the patent applications and/or patents referenced above, unless otherwise stated.

As previously described, in systems for determining the optical properties of objects or materials, it often is desired to obtain precise spectral or other optical characteristics data based on measurements taken by the system. Certain of such systems (such as those in applications referenced above) may employ a flexible fiber optic, light guide or similar cable. Unfortunately, however, flexing or changes in the flex of such a cable can affect the spectral transmission properties of the cable, thereby undesirably altering the spectral data generated by the system.

Certain embodiments of the present invention may be implemented in such systems to address such problems. Such embodiments may be implemented through the use of a flexible cable assembly consisting of one or more fiber optics, light conduit or similar light path. As described in greater detail in the referenced applications, fiber optics conduct light that is within a certain angular range or acceptance range of the fiber optic. The range of angles is quantified by designating a Numerical Aperture (NA) for a fiber optic, as described elsewhere. It has been determined that the amplitude of light propagating within a fiber optic, and the spectral properties of the light propagating within a fiber optic and the angular distribution of light rays within the fiber optic and the path length of light rays within the fiber optic changes as the fiber optic is bent or otherwise strained. The degree of amplitude change, spectral shift and angular shift and path length in general depends upon the geometric properties of the fiber and the degree of flexing of the fiber. The above spectral, angular and amplitude shifting can affect spectroscopy measurements and general optical properties measurements in systems that utilize fiber optic cables.

One solution to such problems is to provide a cable that is held rigid or fixed to avoid flexing, such as the "hand held" embodiments described elsewhere, where flexing of the fiber optics is inhibited or prevented. Another solution is to provide a semi-rigid cable that can not be flexed over small radii. In some applications such as dentistry, however, a semi-rigid cable may be undesirable or impractical. Thus, in accordance with other aspects of the present invention, techniques are provided to measure or quantify the spectral, intensity and/or angular shift in such a cable and to utilize such a measurement to desirably affect the overall optical properties measurement.

FIG. 1 illustrates an embodiment of the present invention utilizing such techniques. Such an embodiment preferably includes a spectrometer, light sensors, a CPU or computer, a fiber optic cable and a probe, such as in one or more embodiments described elsewhere. Cable 860 is such a preferred embodiment and contains one or more source fiber optics (see source fiber optic 838) that provide light from the light source (a preferred arrangement is illustrated as lamp 830, hot mirror 832, glass rod 834 and iris 836, such as described elsewhere) to the material or object being measured and one or more receiver fiber optics that receive light reflected or returned from the material or object and serve to provide light to the spectrometer and/or light sensors. Various embodiments of such a spectrometer and/or light sensors have been described elsewhere. In addition, details of exemplary cable constructions and methods also have been described elsewhere.

A cable in accordance with such preferred embodiments includes one or more additional fibers. Included is at least one additional source fiber, hereinafter referred to as the secondary source fiber or cable/lamp drift source fiber (see fiber 840), and one or more additional receiver fiber(s), hereinafter referred to as secondary receiver fibers or cable/lamp drift sensor fibers (see fibers 848, 850, 854 and 855). Such secondary source fiber and secondary receiver fibers pass down the length of cable 860 parallel to the other fibers (see fibers 838, 846 and 844) in the cable, and the secondary fibers are joined at probe end 862 in portion 864 that includes diffusing cavity 866, preferably a small diffusing cavity such as described elsewhere. Diffusing cavity 866 serves to cause light provided by secondary source fiber 840 to be presented to secondary receiver fibers 848. Secondary receiver fibers 848 provide a light path from diffusing cavity 866 to one or more secondary light sensors (see, e.g., sensors 852 and 858). Fibers 844 and/or 846 preferably pass to optical sensors for purposes of taking spectral or perimeter measurements, as described elsewhere.

Preferably, one of the secondary light sensors is a spectrometer for measuring the spectrum of the light source (or some portion of the spectrum of the light source) after it passes over the length of the cable and back through the cable (see, e.g., filters 856 and sensors 858, implementing one type of spectrometer, such as previously described elsewhere). Another of the light sensors preferably is a "wide band" sensor pair which consists of two or more sensors 852 that are positioned to measure the radial distribution of light in a secondary receiver fiber optic. The details of such a spectrometer for measuring the spectrum of the light source and for adjusting the spectral or other optical characteristics data of such a system in accordance with embodiments of the present invention have been described elsewhere. The details of such a "wide band" sensor that measures the angular distribution of light within a fiber optic have also been described elsewhere.

In accordance with such embodiments, the spectrum of the secondary receiver fibers is measured and saved as part of a normalization process (e.g., with the cable in an unflexed or known flexed condition, etc.; e.g., a first degree of flex). The intensity and angular distribution pattern of the secondary receiver fiber(s) similarly are measured and saved as part of the normalization process. As the system is utilized following the normalization process, the spectrum and angular distribution of the lamp and secondary receiver fibers are monitored while other system measurements (e.g., spectral measurements as described previously or elsewhere) are being taken. In general, if the secondary spectrum and angular distribution do not change, the cable has not been flexed. If, however, there is a change in such parameters, either the lamp spectral properties (including angular distribution such as caused by heating of lamp elements or apertures or infrared filters, etc.) has changed, or the cable has been flexed (e.g., to a second degree of flex, different from the first degree of flex) or otherwise changed to a degree to produce a detectable change. Such changes may thus be measured and monitored.

By providing additional sensors to monitor the lamp source directly such as described herein, it can be determined if the cable is being flexed or if the lamp and/or lamp hardware are changing. In certain applications it may not be necessary to determine which is changing (e.g., either cable flexing or lamp drift), but to simply monitor the overall system drift/changes and adjust the measurements to compensate for drift or to reject the measurements if the system has drifted out of calibration. Such use of normalization data and monitoring of the lamp and cable, etc., is used in preferred embodiments to compensate, and accept or reject, spectral or other optical characteristics data taken in accordance with the present invention.

It should be noted that such embodiments may be used, for example, as a strain gauge or as an instrument to measure if the curvature in a system is changing. In addition, such embodiments may be applied to one or more secondary source fibers and one or more secondary receiver fibers. Such embodiments also may utilize a plurality of secondary source and receiver fibers and a plurality of diffusing cavities distributed along the length of a cable assembly to quantify not only whether or not a cable is being flexed (and to measure and quantify the degree of flexing), but at what point or approximately what point in the cable the flex is occurring.

The secondary source fiber optic also may be provided by the primary source fiber optic utilizing mirrors or the like, or by notching the source fiber and providing a small amount of light to the secondary receiver fibers. What is important in such embodiments is that a portion of the light from the primary source fiber be controllably provided to the secondary receiver fiber(s). Additionally, in a system with a plurality of secondary receiver fibers, one secondary (or primary) source fiber may be utilized to provide sufficient light to all secondary receiver fibers in order for flex determination/quantification purposes in accordance with the present invention. The secondary source fiber may alternately have a light source different from the primary source fiber, and separate correction factors may be accordingly determined for the lamp and for the cable flexing.

It also should be noted that the diffusing cavity optionally may be replaced by a single fiber that serves both as a secondary source and secondary receiver fiber by looping the fiber optic back in the probe (or creating an equivalent of a fiber or optic loop). In accordance with such optional embodiments, two strands of fibers run the length of the cable and serve as a secondary source fiber and a secondary receiver fiber.

In an alternate embodiment, no additional fibers are added to the probe but a mirror such as a hot mirror is mounted or positioned near the end of the probe permitting light of certain frequencies, preferably frequencies that are out of the visible band, to be reflected/returned from one or more primary source fibers to one or more primary receiver fibers. The out of band light frequencies preferably are detected by sensors with notch filters that reject in band light frequencies as discussed elsewhere and that are primarily sensitive to flexing of the cable. Again, what is important is that a secondary receiver fiber (or equivalent return optical path) couple light to optical sensors so that spectral or other changes due to cable flexing and/or lamp drift or the like may be determined and/or quantified, with such flex and/or lamp drift-type data available for correction or further quantification of optical characteristics data in accordance with the present invention.

Figure 2:
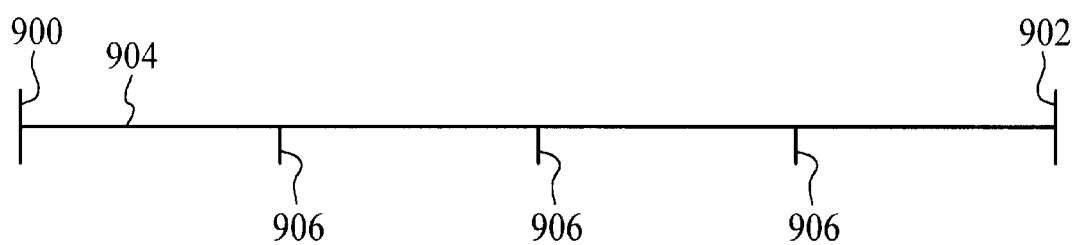
FIG. 2 is a diagram illustrating an embodiment of the present invention utilized in a more general instrument/application for detecting flex of a cable.

FIG. 2 illustrates in diagram form such exemplary general embodiments.

As illustrated in FIG. 2, in accordance with such embodiments an implement, which may be an instrument or probe (such as previously described or referenced or otherwise) or structure (such as a table, building, bridge, etc.), includes a cable with light path 904 extending from first point 900 to point 902. Positioned at either point 900 or 902 is a light source (such as previously described or referenced), and positioned at either point 900 or 902 is a spectrometer or sensor(s) in order to measure, detect or quantify spectral properties of received light (such as previously described or referenced). It should be noted that, depending on the application, such spectrometers or sensors may perform other functions, or other equipment or devices also may be included at such points.

Light from the light source is transmitted down light path 904 from point 900 to point 902, or vice versa. After making one or plural passes down light path 904, the spectrometers or light sensors at either point 900 or 902 (or both), spectral properties of the light are determined or quantified and stored. This may be considered a normalized, baseline, initial or first spectral measurement or measurements. It should be noted that such measurement or measurements are taken preferably with a predetermined, known or other reference flex condition or degree of flex. Thereafter, periodically or at a subsequent time or times, additional spectral measurements may be taken and compared with the normalized, baseline, initial or first spectral measurement or measurements. Based on the comparison and the change between the spectral data between the measurements or sets of measurements, the degree of flex, or a change in the flex condition or in the degree of flex, of the cable including light path 904.

It should be noted that the light source could be located at point 900 and the spectrometer and/or sensor(s) at point 902, or vice versa, with the light passing once through light path 904. Alternatively, the light source and spectrometer and/or sensor(s) could be located at the same point, either 900 or 902, with the light passing from one end of the light path to the other end of the light path, and then returning down the light path to the one end where it is presented to the spectrometers or sensor(s). In addition, it is possible for the light to make one, two, three or some other number of passes along the light path prior to being presented to the spectrometer or sensor(s). To make a turn at one end for purposing of returning the light down the light path, a mirror, light path loop, diffusing cavity as described elsewhere or other implement to return the light to the light path may be employed. What is important is that the light make at least one trip down the light path, with measurements taken in order to detect, determine or quantify flexing, or a change in the flex condition of the cable that includes light path 904.

Also illustrated in FIG. 2 are take off points 906, which can be any number of points along light path 904, preferably at predetermined physical locations. A spectrometer or sensor(s) may be located at points 906, or separate light sources may be provided at points 906, or mirrors, light path loops, etc. may be provided at points 906. In accordance with the principles previously described, light paths may go to, from or to and from points 906 and points 900 or 902, with spectral data of light passing through such light paths being measured and used to determine flex in the cable that includes light path 904. Knowing the physical location of points such as points 906, and in essence obtaining spectral data of light passing to, from or to and from such points, a determination or estimation of the point of flex also may be made.

As will be appreciated, determining or detecting flex or degree of flex or a change in flex may accomplished in accordance with the present invention and applied to a wide variety of applications and implements. Flex data, or the detection of a change in flex, may be used to quantify other data, sound an alarm, prompt a message or other action and the like. The particular examples set forth herein or referenced herein are exemplary, but believed to be particularly useful and novel applications of such techniques.

Although various preferred embodiments of the present invention have been disclosed for illustrative purposes, those skilled in the art will appreciate that various modifications, additions and/or substitutions are possible without departing from the scope and spirit of the present invention as disclosed in the claims. It also should be noted again that the implements, methodologies and applications described in the co-pending applications and patents referenced above also may be applied to embodiments and features of the present invention as described herein. It should also be noted that the present invention may be applied to fiber optics, whether solid, liquid or otherwise, light guides or other light transmission implements having total internal reflection or equivalent light transmission properties so that spectral changes due to flexing of the light path may be detected, determined or quantified in accordance with the principles described herein or elsewhere. All such refinements, enhancements and further uses of the present invention are within the scope of the present invention.

What is claimed is:

1. A method for detecting curvature, comprising the steps of:
   passing light down a fiber optic light path, wherein the light is generated by a light source providing light over a band of wavelengths;
   making a first spectral measurement of the light passed down the light path and generating first data indicative of the light passed down the light path at a first time, wherein the first measurement includes coupling the light passed down the light path through a plurality of filters into a plurality of optical sensors to measure light over a plurality of wavelengths;
   making a second spectral measurement of the light passed down the light path with the plurality of filters and plurality of optical sensors and generating second data indicative of the light passed down the light path at a second time;
   comparing the first and second data; and
   detecting whether a change in the curvature of the light path has occurred based on the comparison.

2. The method of claim 1, further comprising the steps of:
   determining data indicative of the optical characteristics of an object with a probe, wherein the light path passes through at least a portion of the probe;
   generating data indicative of the curvature of the light path; and
   adjusting the data indicative of the optical characteristics of the object based on the data indicative of the curvature of the light path.

3. The method of claim 1, wherein the light path is part of a structure, wherein the step of detecting whether a change in the curvature of the light path produces data indicative of whether the structure is being flexed.

4. The method of claim 1, wherein the plurality of filters and plurality of optical sensors comprise a spectrometer.

5. The method of claim 1, wherein the spectrometer determines whether a change in curvature of the light has occurred based on measuring light at a plurality of wavelengths.

6. The method of claim 1, further comprising the step of detecting a change in spectral characteristics of a light source providing light to the light path.

7. The method of claim 6, wherein the light source comprises a lamp.

8. The method of claim 1, wherein the first and second spectral measurements also include coupling the light passed down the light path through a plurality of wideband optical sensors positioned to measure the radial or angular distribution of light from the light path, wherein changes in the radial or angular distribution of light are detected.

9. The method of claim 8, wherein the light is provided by a light source, wherein the radial or angular distribution of light from the light source are controlled.

10. The method of claim 9, wherein light from the light source is coupled through an iris.

11. The method of claim 1, wherein the light path extends from a first end to a second end, wherein the plurality of filters and plurality of optical sensors are divided into sets positioned at a plurality of different points along the light path, wherein each set of filters and optical sensors take first and second spectral measurements at the plurality of different points along the light path, wherein the method further comprises the step of determining an approximate point along the light path at which the change in curvature has occurred.

12. The method of claim 11, wherein each set of filters and optical sensors comprises a spectrometer.

13. The method of claim 1, wherein the light passes from a light source at a first end of the light path to a second end of the light path, wherein the light returns through the light path to the first end.

14. The method of claim 1, wherein the light passes from the first end of the light to the second end of the light path and from the second end of the light path to the first end of the light path through separate fiber optics.

15. The method of claim 14, wherein, at the second end of the light path, light is coupled from a first source fiber optic to a second return fiber optic through a mirror, light loop or diffusing cavity.

* * * * *